(12) United States Patent
Nors (10) Patent No.: US 8,677,468 B2
(45) Date of Patent: Mar. 18, 2014

(54) SERVICE ACTIVATION IN A PASSIVE OPTICAL NETWORK (PON)

(75) Inventor: Niclas Nors, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 163 days.

(21) Appl. No.: 13/008,985

(22) Filed: Jan. 19, 2011

(65) Prior Publication Data

US 2012/0185927 A1   Jul. 19, 2012

(51) Int. Cl.
*H04L 29/06* (2006.01)

(52) U.S. Cl.
USPC .................................. 726/9; 398/66

(58) Field of Classification Search
USPC .................................. 726/9; 398/66
See application file for complete search history.

(56) References Cited

U.S. PATENT DOCUMENTS

| | | | |
|---|---|---|---|
| 2006/0129814 A1 | 6/2006 | Eun et al. | |
| 2007/0133422 A1* | 6/2007 | Su | 370/248 |
| 2007/0133800 A1 | 6/2007 | Kim et al. | |
| 2007/0274720 A1* | 11/2007 | Menasco et al. | 398/66 |
| 2009/0049532 A1* | 2/2009 | Gao et al. | 726/5 |
| 2009/0269063 A1* | 10/2009 | Bernard et al. | 398/66 |
| 2011/0098030 A1* | 4/2011 | Luoma | 455/419 |
| 2011/0214160 A1* | 9/2011 | Costa et al. | 726/3 |

FOREIGN PATENT DOCUMENTS

| | | |
|---|---|---|
| EP | 2 007 063 A1 | 12/2008 |
| WO | 2010/038938 A1 | 4/2010 |

OTHER PUBLICATIONS

Gemalto,"Smart Card in IMS", www.gemalto.com, Jan. 2007, p. 2 & 4-5.*
International Search Report in corresponding International Application No. PCT/SE2011/050190, mailed Nov. 21, 2011.
Written Opinion of the International Searching Authority in corresponding International Application No. PCT/SE2011/050190, mailed Nov. 21, 2011.
Zhou, Luying et al., "IMS Service Plane Enabled Heterogeneous Networks for Multimedia Applications", IEEE Globecom 2010 Workshop on Advances in Communications and Networks; Dec. 6-10, 2010; pp. 2017-2021; Singapore.
Sunk-Sik Roh, et al.; "Security Model and Authentication Protocol in EPON-based Optical Access Network"; Transparent Optical Networks, 2003; Proceedings of 2003 5th International Conference, vol. 1, Mo.C2.7; Jun. 29-Jul. 3, 2003; Section 4.1 and 4.2; pp. 99-102; Korea.
Gemalto; "Technical White Paper: Smart Card in IMS"; Feb. 2007 [retrieved from internet http://www.4gamericas.org/documents/GEM_WP-IMS.pdf]; pp. 1-10.

(Continued)

*Primary Examiner* — Jason K. Gee
*Assistant Examiner* — Christopher C Harris
(74) *Attorney, Agent, or Firm* — Potomac Patent Group PLLC (57) ABSTRACT

An Optical Line Terminal (2) connected to a Passive Optical Network provides a service to a Client device (1, 8) by receiving its hardware identity, as well as SIM-authentication information, from the Client device, and forwarding to the Authentication Server (3). After authentication of an end-user, a relationship is created between the Client device and the end-user. The OLT activates a service, based on service subscriptions associated with the end-user and on hardware-dependent service definitions associated with the Client device.

22 Claims, 10 Drawing Sheets

(56) References Cited

OTHER PUBLICATIONS

3rd Generation Partnership Project (3GPP); "3rd Generation Partnership Project; Technical Specification Group Services and System Aspects; Generic Authentication Architecture (GAA); Generic Bootstrapping Architecture (GBA) (Release 10)"; 3GPP TS 33.220 V10.0.0 (Oct. 2010); pp. 1-75; Valbonne, France.

3rd Generation Partnership Project (3GPP); "3rd Generation Partnership Project; Technical Specification Group Services and System Aspects; Generic Authentication Architecture (GAA); Access to network application functions using Hypertext Transfer Protocol over Transport Layer Security (HTTPS) (Release 10)"; 3GPP TS 33.222 V10.0.0 (Oct. 2010); pp. 1-22; Valbonne, France.

3rd Generation Partnership Project (3GPP); "3rd Generation Partnership Project; Technical Specification Group Services and System Aspects; Generic Authentication Architecture (GAA); Early implementation of HTTPS connection between a UICC and a NAF (Release 7)"; 3GPP TR 33.918 V.7.0.0; Dec. 19, 2005; pp. 1-12; Valbonne, France.

International Preliminary Report on Patentability issued in corresponding International application No. PCT/SE2011/050190, date of completion Mar. 11, 2013.

* cited by examiner

SERVICE ACTIVATION IN A PASSIVE OPTICAL NETWORK (PON)

TECHNICAL FIELD

The present invention relates to a method for an Optical Line Terminal (OLT) connected to a Passive Optical Network (PON) of providing a service to a Client Device, and a method for a Client Device, connected to a Passive Optical Network (PON), of receiving a service from an Optical Line Terminal. The invention also relates to an Optical Line Terminal and to a Client Device.

BACKGROUND

Broadband access can be implemented by a fiber optical access network, e.g. a B-PON (Broadband Passive Optical Network or a G-PON (Gigabit-capable Passive Optical Network). A passive optical network (PON) does not use any electrically powered components to split the signal, and it comprises an OLT (Optical Line Terminal) located at the service provider's central office and providing an interface for the delivery of the services, e.g. telephony, Ethernet data or video, over the PON. The PON typically comprises one or more ONUs (Optical Network Units) or ONTs (Optical Network Terminations), which are connected to the OLT over an ODN (Optical Distribution Network), the ODN including optical fibers. Each ONT/ONU terminates the PON and converts the optical signals into electrical signals for delivery of the services to the end-user terminals, via a suitable user interface.

A so-called MDU (Multi-Dwelling Unit) is an ONU/ONT for multiple subscribers, e.g. for a number of apartments in an apartment building, and the MDU is provided with a suitable number of ports, such as e.g. 24. On the contrary, a Single Family Unit is an ONT/ONU adapted for a single household. An MDU is typically connected to a suitable number of CPEs (Customer Premises Equipments) located in each apartment via a Residential Gateway.

According to current standards, an ONU (Optical Network Unit) is a generic term for a device that terminates any one of the distributed (leaf) endpoints of an ODN, implements a PON protocol, and adapts PON PDU (PON Protocol Data Units) to subscriber service interfaces. In some contexts, an ONU implies a multiple-subscriber device, such as the above-mentioned MDU. An ONT (Optical Network Termination) may be defined as a single subscriber device that terminates any one of the distributed (leaf) endpoints of an ODN, implements a PON protocol, and adapts PON PDUs to subscriber service interfaces. Thus, an ONT may correspond to a CPE, as described above, and could be provided with an Integrated Residential Gateway.

Conventionally, the identity of the hardware equipment is used for identifying a CPE or an ONT, as well as for identifying the end-user and the services to which the end-user is subscribing. Further, only the hardware equipment is authenticated, and not the end-user. Since the authentication is based on the identity of the hardware equipment, and not on the identity of the end-user, a coupling exists between the hardware equipment and the end-user. Due to this coupling between the hardware equipment and the end-user/customer, the services will follow the equipment, instead of the end-user.

Accordingly, an activation of a service is typically connected to the activation of the equipment itself, i.e. an installation of an equipment and an activation of a service are typically performed in the same procedure. Thus, it is difficult for an end-user/customer to move a service from one location to another location without moving the equipment, or requiring a re-provisioning by the operator.

SUMMARY

It is an object of the embodiments described hereinafter to address at least some of the issues outlined above, and this object and others are achieved by the method and the arrangement according to the appended independent claims, and by the embodiments according to the dependent claims.

According to a first exemplary aspect, a method is provided for an Optical Line Terminal (OLT) connected to a Passive Optical Network (PON) of providing a service to a Client device. The method comprises the OLT discovering a Client device connected to the Passive Optical Network, and receives a hardware identity for authentication of the Client device. The OLT further receives SIM-authentication information from the Client device, and forwards to the Authentication Server for authentication of an end-user of the Client device. Next, the OLT creates a relationship between the Client device and the end-user, and activates a service for the client device, based on service subscriptions associated with the end-user and on hardware-dependent service definitions associated with the Client device.

The method may further comprise a provisioning of the service, the provisioning comprising configuring the service depending on the hardware of the Client device, the configuring being based on hardware-dependent service definitions associated with the Client device. Said hardware-dependent service definitions may be stored in the Optical Line Terminal.

Further, a communication channel may be established between the Client device and the OLT over an Optical Distribution Network.

The service subscriptions associated with the end-user may be received from the Authentication Server, or may alternatively be stored in the Optical Line Terminal.

According to a second exemplary aspect, a method is provided for a Client device of receiving a service provided by an Optical Line Terminal (OLT) connected to a Passive Optical Network. The method comprising the Client device connecting to the Passive Optical Network, and sends its hardware identity to the Optical Line Terminal for authentication of the Client device. Next, the Client device sends SIM-authentication information to the Optical Line Terminal, to be forwarded to an Authentication Server for authentication of an end-user of the Client device, and receives a service activated by the Optical Line Terminal. The service activation is based on service subscriptions associated with the end-user and on hardware-dependent service definitions associated with the Client device, the service activation further based on a relationship between the Client device and the end-user.

The Client device may further receive a SIM-card identifying an end-user, or install a Soft-SIM.

According to a third exemplary aspect, an Optical Line Terminal (OLT) is provided, the Optical Line Terminal being connectable to a Passive Optical Network, and being arranged to provide a service to a Client device of the Passive Optical Network. The Optical Line Terminal comprises a Receiving unit for receiving from a client device a hardware identity for authenticating a Client device, and SIM-authentication information for authenticating an end-user. The OLT further comprises a Sending unit for forwarding SIM-authentication information received from a Client device to an Authentication Server, a Binding unit for creating a relationship between a client device and an end-user, and a Service activating unit for activating a service to a Client device, based on a service subscription associated with an end-user, and on hardware-dependent service definitions associated with the Client device.

The Service activating unit of the OLT may be further arranged to provision a service by configuring a service depending on the hardware of the Client device, the configuring being based on said hardware-dependent service definitions associated with the Client device.

Further, the Receiving unit of the OLT may be arranged to receive service subscriptions associated with an end-user from an Authentication server.

The Optical Line Terminal may further comprise a Storage unit for storing service subscriptions associated with an end-user, and the hardware-dependent service definitions associated with a Client device.

According to a fourth exemplary aspect, a Client device is provided, the Client Device being connectable to a Passive Optical Network, and being arranged to receive a service provided by an Optical Line Terminal. The Client device comprises a Connection unit for connecting to the Passive Optical Network and sending its hardware identity to the Optical Line Terminal for authenticating the Client device. The Client device further comprises a Sending unit for sending SIM-authentication information for authenticating of an end-user of the Client device to the Optical Line Terminal, and a Service unit for receiving a service activated by the Optical Line Terminal. The activation is based on a service subscription associated with an end-user, and on hardware-dependent service definitions associated with a Client device, and further on a relationship created between the end-user and the Client device.

The Client Device may further comprise a SIM-card-receiving unit.

Said Client Device may be a Single Family Unit Optical Network Termination (SFU ONT), or a Customer Premises Equipment connected to a Multi-Dwelling Unit (MDU), wherein the Customer Premises Equipment is configured to communicate with the Optical Line Terminal over the Multi-Dwelling Unit.

An advantage with the embodiments is to "de-couple" an end-user from the hardware equipment, enabling a separation between the installation of the hardware equipment and an activation of a service.

BRIEF DESCRIPTION OF THE DRAWINGS

Exemplary embodiments of the invention will now be described in more detail, and with reference to the accompanying drawings, in which.

DETAILED DESCRIPTION

In the following description, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it is apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

It is a concept of exemplary embodiments described hereinafter to use a SIM-card for identifying and authenticating an end-user of a Client Device, and to activate a service based on the service subscriptions of the authenticated end-user, and on hardware-dependent service definitions associated with the hardware identity of the Client device.

A Subscriber Identity Module (SIM) is commonly used in mobile telecommunication in order to identify a subscriber, and the services that are available to the subscriber. A SIM is typically stored on a device called a SIM-card, which is provided to the subscriber by an operator, and a SIM-card can be removably inserted into a mobile phone.

Alternatively, a SIM may be implemented as a so-called Soft-SIM, i.e. a software Subscriber Identity Module that can be installed e.g. in a mobile phone without requiring any hardware.

A conventional SIM-card comprises a unique serial number, a unique number identifying the end-user, e.g. an IMSI (International Mobile Subscriber Identity), as well as security authentication and ciphering information, temporary information related to the local network, and a list of the services that are available to the subscriber.

Presently, SIM-cards come in three different sizes and packages, in order to be inserted into different devices. More specifically, the term SIM is used in GSM (Global System for Mobile Communication), while the equivalent term USIM (Universal Subscription Identity Module) may be used in the UMTS (Universal Mobile Telecommunication System), and the term R-UIM (Removable User Identity Module) in the CDMA (Code Division Multiple Access). Even though different terms could be used in different technologies for subscriber identifying modules with similar functionality as a SIM, the generic term SIM will be used hereinafter for a Subscriber Identity Module, which in different mobile phone technologies may have different names, as explained above.

A Client Device, according to one exemplary embodiment, corresponds to a single family unit (SFU) ONT provided with a SIM-card. However, other exemplary embodiments are applicable to a Multi Dwelling Unit (MDU), but then the SIM-card will be inserted in a CPE (Customer Premises Equipment) installed in the customer location and connected to the MDU. Thus, an ONT or a CPE is installed at a customer location, with an optical fibre connected by the installer (or by the end-user). The end-user subscribes to services from an operator, and the operator has sent a SIM-card to the end-user for service activation.

According to another exemplary embodiment, the SIM-card is a Soft-SIM that is installed in an ONT or in a CPE.

Figure 1:
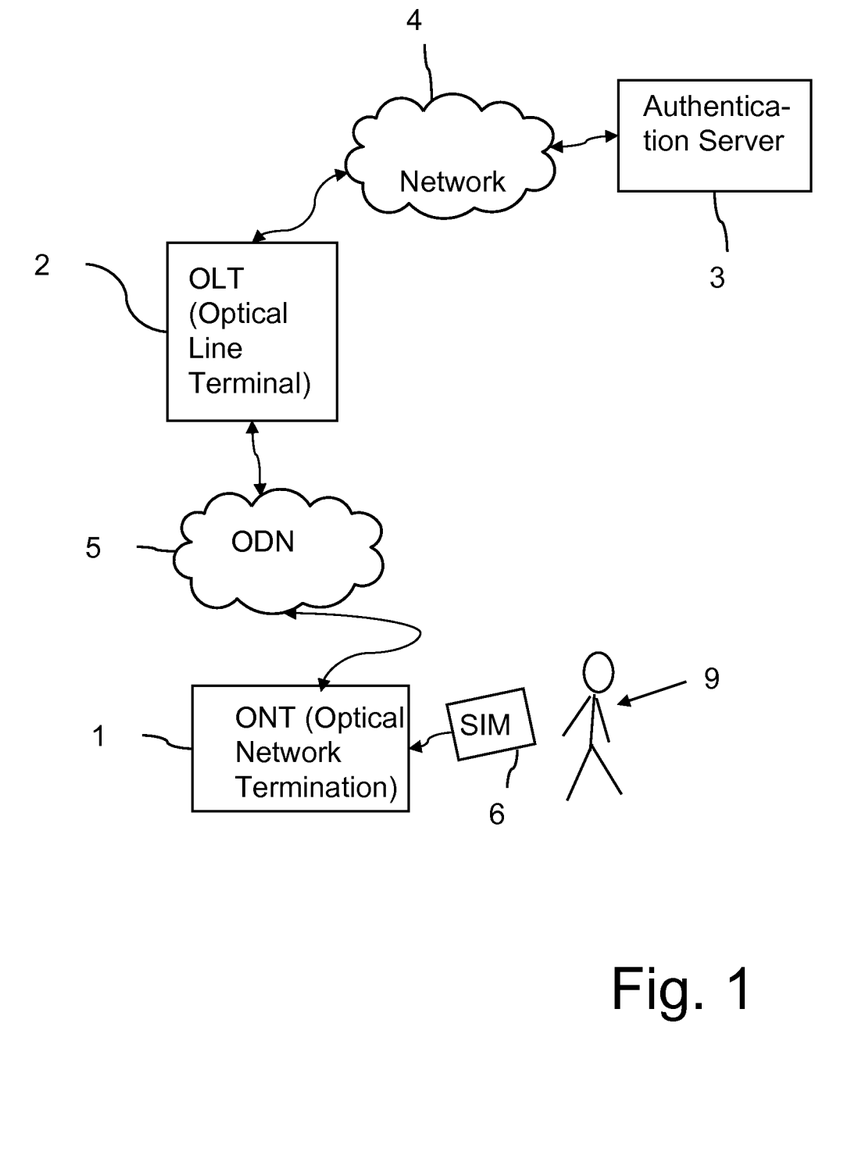
FIG. 1 schematically illustrates a first exemplary architecture for authentication of an end-user.

FIG. 1 schematically illustrates a first exemplary PON-architecture for authentication of an end-user, in which the Client device corresponds to an SFU ONT 1, and the SIM-card is a hardware-SIM. The ONT is installed at the customer location, and an end-user 9 is able to insert a SIM-card 6 received from the operator into the ONT, when he/she wishes to receive a service. The architecture further comprises an OLT 2 with communicates with the ONT over an ODN 5 (Optical Distribution Network), and with an Authentication Server 3, e.g. over an Ethernet 4.

First, the end-user 9 inserts the received SIM Card into the ONT. After power-on, the ONT will connect to the PON and start the physical (lower) layer of authentication, which is technology-specific and differs between the different PON-technologies. However, the basic part of this physical authentication is to make the OLT 2 aware of the presence of a new ONT, and to negotiate the necessary physical layer settings, such that the ONT is able to identify itself in order to access subscribed services. The ONT identifies itself with its hardware identity, which may be a serial number, a MAC address or some other unique hardware identifier.

Thus, the OLT 2 will discover that a new ONT 1 is connected to the ODN 5, and will receive the hardware identity of the ONT, which also identifies the type of hardware equipment. A service definition exists for each particular type of hardware equipment, which describes how different services, e.g. Data, VoIP (Voice over the Internet Protocol) or IPTV (Internet Protocol Television) are provisioned for the equipment. Those hardware-dependent service definitions are typically stored in the OLT, and such a service definition is applied when the OLT activates a service and provisions the service to the ONT.

When the OLT is aware of the new ONT, it will establish a management channel for communication, which allows for end-user authentication communication with an Authentication Server.

According to an exemplary embodiment, the end-user authentication uses a standardized protocol, e.g. the conventional EAP (Extensible Authentication Protocol) encapsulated according to the IEEE 802.1X-standard, also known as EAPOL (Extensible Authentication Protocol over a Local Area Network). A conventional 802.1X authentication involves three parties, i.e. an 802.1X supplicant, an 802.1X authenticator, and an authentication server. The 802.1X supplicant is hosted in a Client device that wishes to attach to the network.

The 802.1X authenticator may be hosted in an OLT, and acts as a security guard to a protected network. The 802.1X supplicant, i.e. the Client device, is not allowed access through the authenticator to the protected side of the network until the supplicant's identity has been validated and authorized. The authenticator forwards the credentials to an authentication server for verification of the supplicant. An authentication between the 802.1X supplicant, i.e. the Client Device, and the authentication server is completed with the help of the authenticator who relays the messages. The 802.1X may for example be used on a Layer 2 (MAC) level, wherein the ONT does not need any IP address. According to an alternative exemplary embodiment, both the 802.1X supplicant and the 802.1X authenticator are hosted in the ONT, together with a Radius or Diameter Client, which are communicating with the OLT on a Layer 3 (IP) level.

Thus, according to an exemplary embodiment, an 802.1X Authenticator, hosted in the OLT, initiates the authentication procedure towards an 802.1X Supplicant, which is hosted in the ONT. When the 802.1X Supplicant hosted in the ONT answers the initial identity request, the answer is forwarded by the 802.1X Authenticator, hosted in the OLT, to a Radius/Diameter Client, which is also hosted in the OLT.

According to a further exemplary embodiment, the Radius/Diameter Client communicates with a Radius/Diameter Server hosted in the Authentication Server 3 for authenticating the end-user indentified by the SIM. However, the Authentication Server could alternatively be a GSM HLR (Home Location Registry) using the conventional SS7 signalling, or any other authentication server that comprises user authentication information. The authentication of the end-user is performed by a conventional iterative message exchange that requires relaying of multiple messages.

When the authentication is completed, the authentication server answers with an authentication accept message, which will be detected by the OLT, thereby informing the OLT that the end-user is authorized to receive a service, and enabling the OLT to detect the binding between the end-user and the hardware equipment, i.e. a Client device (ONT). Based on this binding detection, the OLT establishes a connection between the end-user identity and the hardware equipment identity.

Further, when the end-user is authenticated, the services connected to this user is also known to the OLT, either received from the Authentication server, or retrieved from a local user account storage in the OLT. Since the hardware equipment identity is also known to the OLT, and a relationship has been created between the end-user and the hardware equipment, the OLT is able to generate provisioning information for service activation, based on the services to which the end-user is subscribing, and the type of hardware equipment used by the end-user, as discovered at the connection of the ONT.

Since the provisioning is hardware-dependent, the hardware identity, which also indicates the equipment type, is important for the provisioning, and the services belonging to a particular end-user are converted by the OLT into a hardware-dependent configuration used for the service activation and provisioning.

Thus, when both the end-user and the corresponding hardware equipment are known to the OLT, the OLT is able to retrieve the end-user service subscription definition and the corresponding hardware-dependent service definition, and apply a service provisioning that is suitable for the hardware equipment, i.e. the Client device (ONT) that is currently used by the end-user. The provisioning of the ONT to activate the service is performed over the ODN, based on the PON technology.

Apparently, the services that are available to the end-user are de-coupled from any hardware dependencies until the moment of the service activation, at which moment the identity of the end-user and the identity of the hardware equipment are combined to form a hardware-dependent configuration. Thus, if the end-user moves to another house, which is provided with another type of hardware equipment, no changes are needed in the service subscription definition for the end-user. A hardware-dependent service definition only have to be defined once for a specific type of hardware equipment, which will have no impact to the end-user service subscription definitions.

Figure 2:
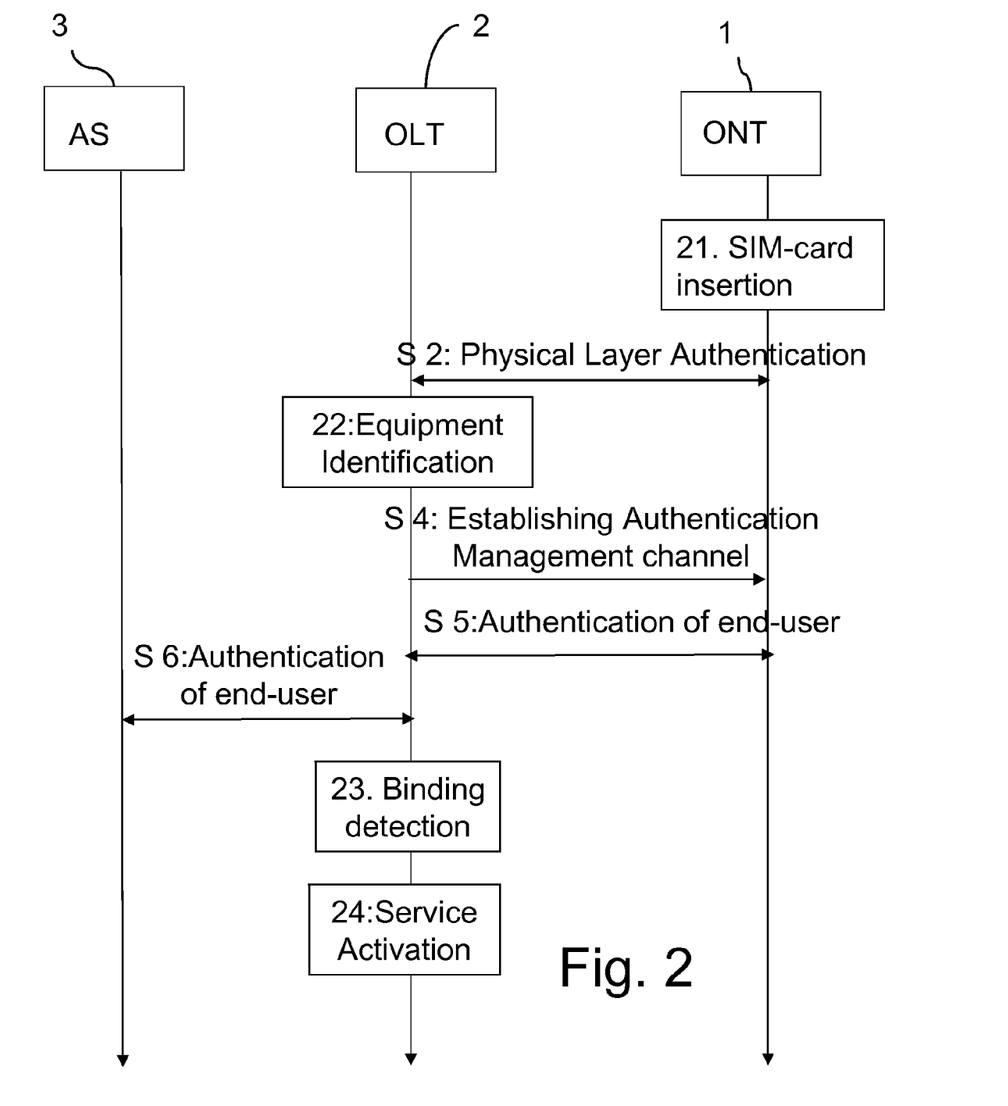
FIG. 2 illustrates an exemplary signalling diagram for the architecture in FIG. 1.

This procedure is illustrated schematically in the exemplary signalling diagram in FIG. 2, in which a SIM-card is inserted in the ONT 1, in step 21. When the ONT is powered-on and connected to the ODN, the OLT 2 will discover the presence of the ONT, and a physical layer-authentication of the ONT will be performed between the ONT and the OLT, by a sequence of signals indicated by S2. After the authentication, the hardware identity of the ONT is known by the OLT, in step 22, and the OLT will establish a communication channel to the ONT, in signal S4, for authentication of the end-user. The authentication of the end-user is performed by a communication between the ONT, the OLT and the Authentication Server 5, as indicated by signals S5 and S6, and as explained in more detail above.

After the authentication of the end-user, the OLT is able to detect the binding between the identity of the end-user and of the corresponding hardware equipment (i.e. the ONT) used by the end-user, in step 23, and establish a connection between the two. By means of this connection, and by retrieving the services available to the end-user, the OLT is able to activate a service, in step 24, and provide to the ONT.

Figure 3:
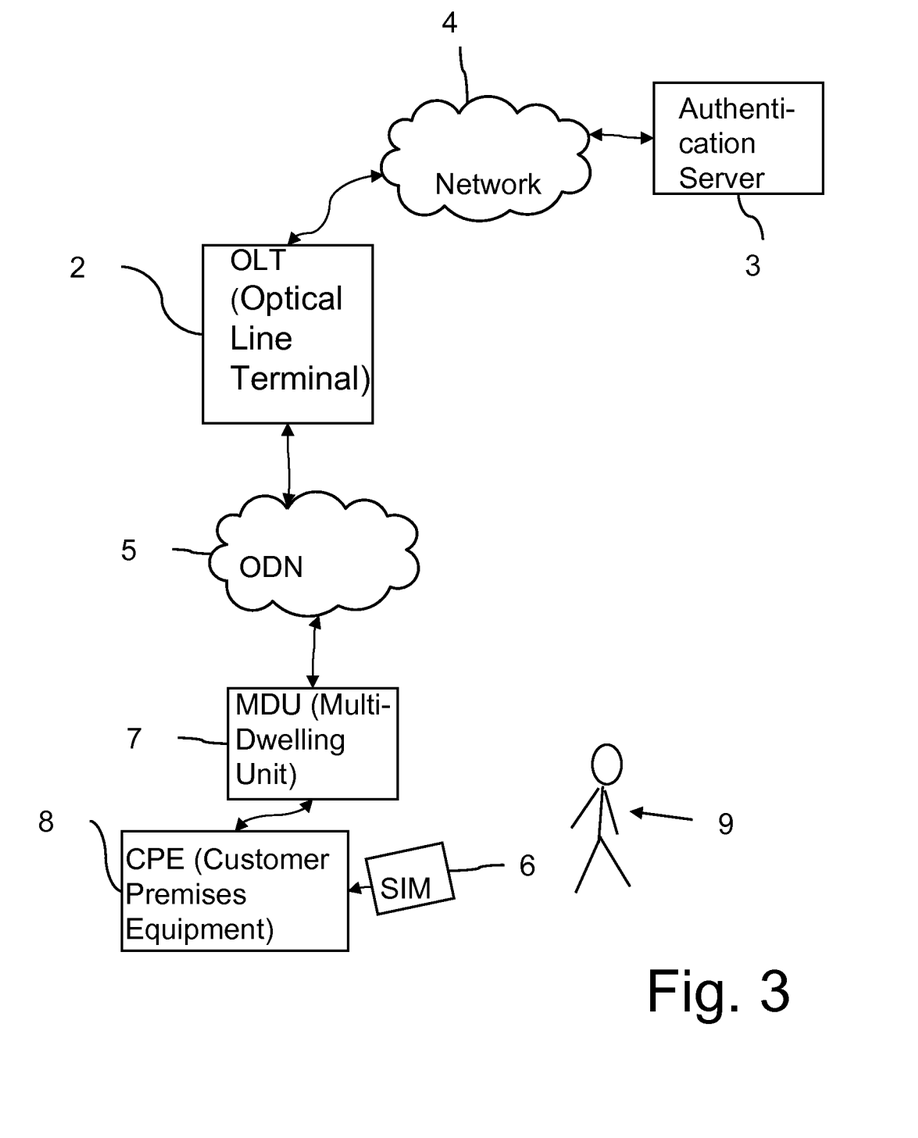
FIG. 3 schematically illustrates a second exemplary architecture for authentication of an end-user.

FIG. 3 schematically illustrates a second exemplary PON-architecture for authentication of an end-user, comprising an MDU 7 shared by multiple users, and connected to several CPEs. One of the CPEs 8 is installed at the location of the end-user 9, and a SIM-card 6 received from the operator can be inserted into the CPE by the end-user. The architecture further comprises an OLT 2 with communicates with the MDU 7 over an ODN 5, and with an Authentication Server 3 over a suitable network 4, e.g. an Ethernet.

Thus, this second exemplary embodiment shows a corresponding scenario, using the same mechanisms as in the above-described first embodiment, but adapted to a Multi Dwelling Unit (MDU) connected to a CPE.

In this second embodiment, each port of the MDU represent an end-user, and therefore the MDU is able to control the access on each port.

Figure 4:
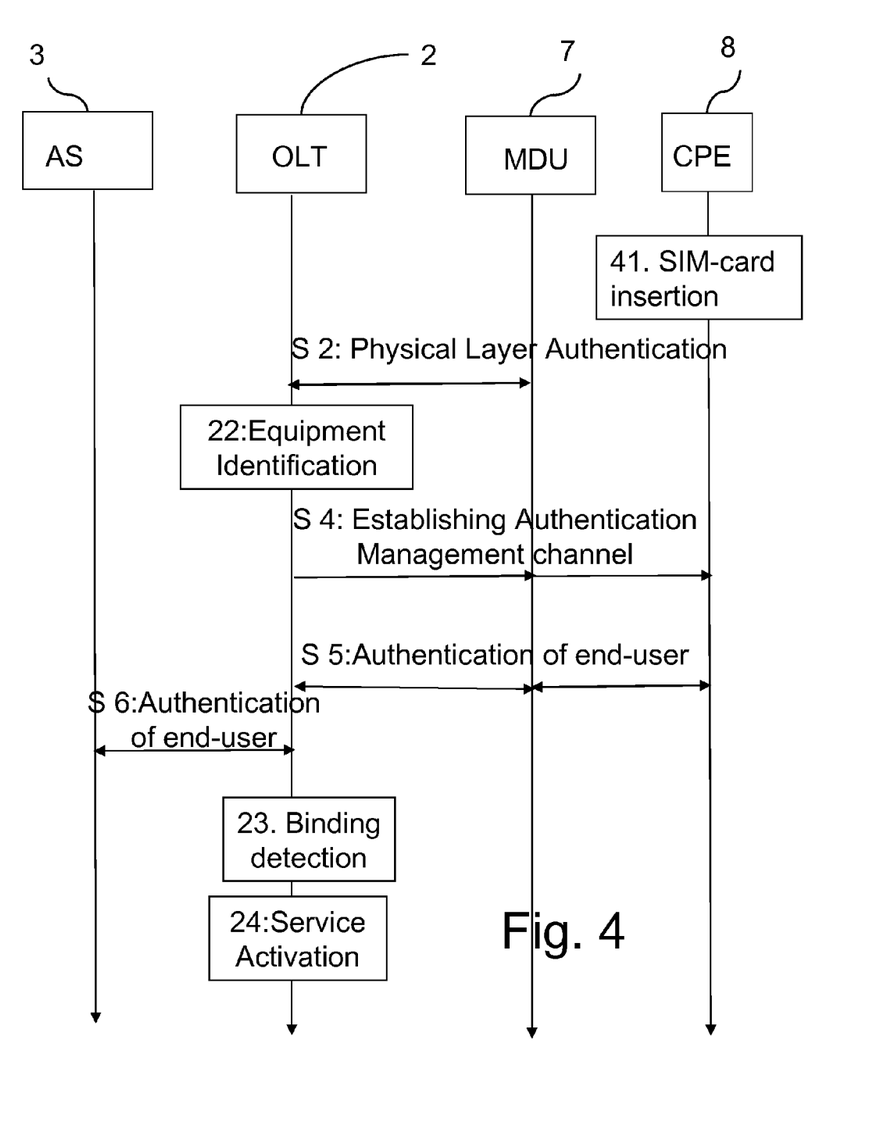
FIG. 4 illustrates an exemplary signalling diagram for the architecture in FIG. 3.

This procedure according to this second embodiment is illustrated schematically in the exemplary signalling diagram in FIG. 4, in which the Client device corresponds to a CPE 8 located at the location of the end-user, the CPE connected to a MDU 7. The SIM-card is inserted in the CPE 8, in step 41. When the CPE is powered-on and connected to the MDU via the ODN, the OLT 2 will discover the presence of the CPE, and a physical layer-authentication of the CPE will be performed between the MDU and OLT by a sequence of signals indicated by S2. After the authentication, the hardware identity of the CPE is known by the OLT, in step 22, and the OLT will establish a communication channel to the CPE over the MDU, in signal S4, for authentication of the end-user. The authentication of the end-user is performed by a communication between the CPE, the MDU, the OLT and the Authentication Server 3, as indicated by signals S5 and S6, and as explained in more detail above. After the authentication of the end-user, the OLT is able to detect the binding between the identity of the end-user and of the corresponding hardware equipment (i.e. the CPE) used by the end-user, in step 23, and establish a connection between them. By means of this connection, and by retrieving the services available to the end-user, the OLT is able to activate a service, in step 24, and provide to the CPE, over the MDU.

Figure 5:
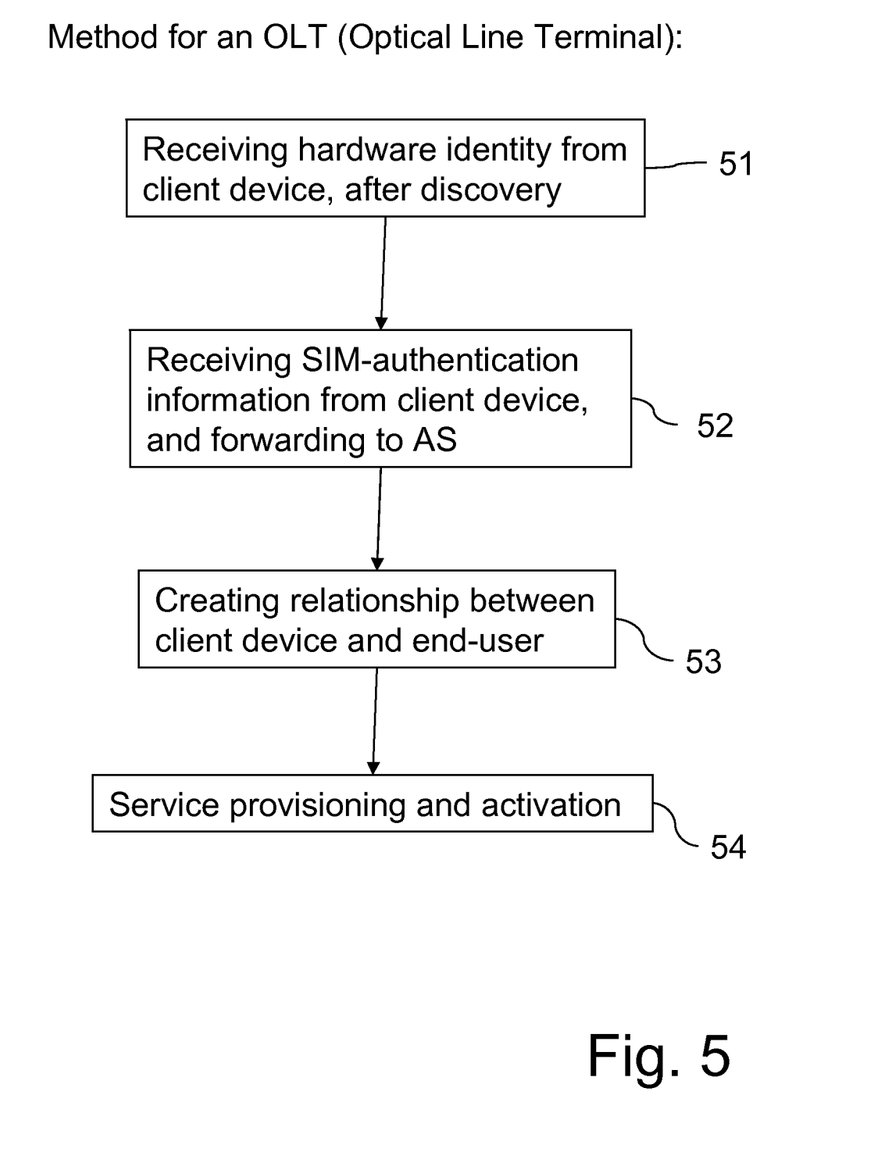
FIG. 5 is a flow diagram schematically illustrating an OLT providing a service to a Client device, according to an exemplary embodiment.

FIG. 5 is a flow diagram illustrating exemplary embodiments of a method for an OLT. In step 51, the OLT receives the hardware identity of a Client Device connected to the PON, after discovery of the Client Device. After establishing a communication channel to the Client Device for authentication of the end-user, the OLT receives authentication information from a SIM-card of the Client Device, in step 52, and forwards to the Authentication Server. After the authentication of the end-user, the OLT knows the identity of the end-user, and the hardware identity of the Client device, and establishes a relationship between them, in step 53, based on a detected binding. Since the relationship is known to the OLT, the OLT is able to activate a service based on service subscription definitions associated with the end-user, and on hardware-dependent service definitions associated with the client device, in step 54, and provide to the Client Device, based on a hardware-dependent configuration.

The provisioning may comprise a configuring of the service depending on the hardware of the Client device, the configuring being based on hardware-dependent service definitions that may be stored in the OLT.

The service subscription definitions may be received from the Authentication server, or stored in the OLT.

Figure 6:
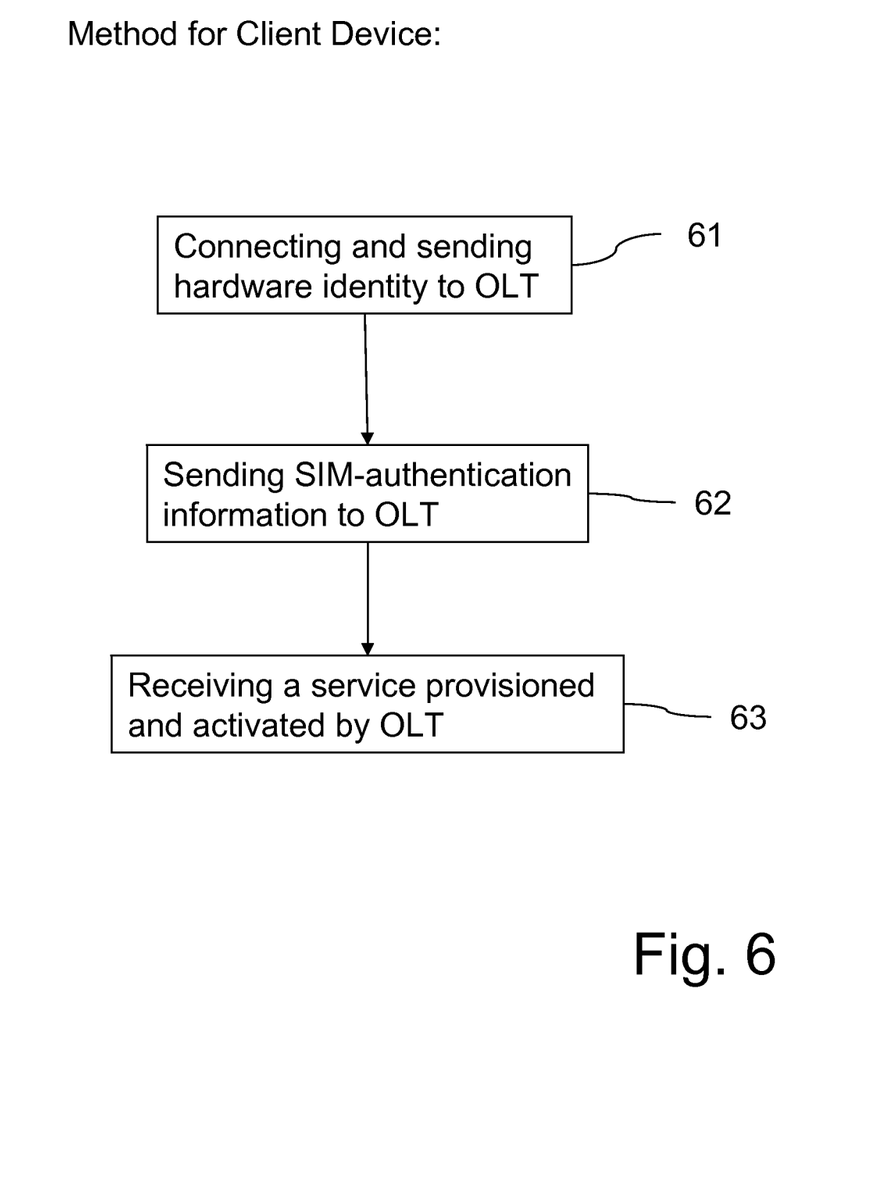
FIG. 6 is a flow diagram schematically illustrating a Client device receiving a service provisioned by an OLT according to an exemplary embodiment.

FIG. 6 is a flow diagram illustrating an exemplary embodiment of a method for a Client Device. In step 61, the Client Device connects to the PON, and sends the hardware identity to the OLT. After the establishment of a communication channel, the Client Device sends authentication information from a SIM-card to the OLT for authentication of the end-user, in step 62, to be forwarded to the Authentication Server by the OLT. After the authentication of the end-user, the OLT knows the identity of the end-user, and the hardware identity of the Client device, and establishes a relationship between them, based on a detected binding. Thus, the OLT is able to activate a service based on service subscription definitions associated with the end-user, and on hardware-dependent service definitions associated with the client device. Then, in step 63, the Client Device receives a service, the service activated and provisioned by the OLT.

Figure 7:
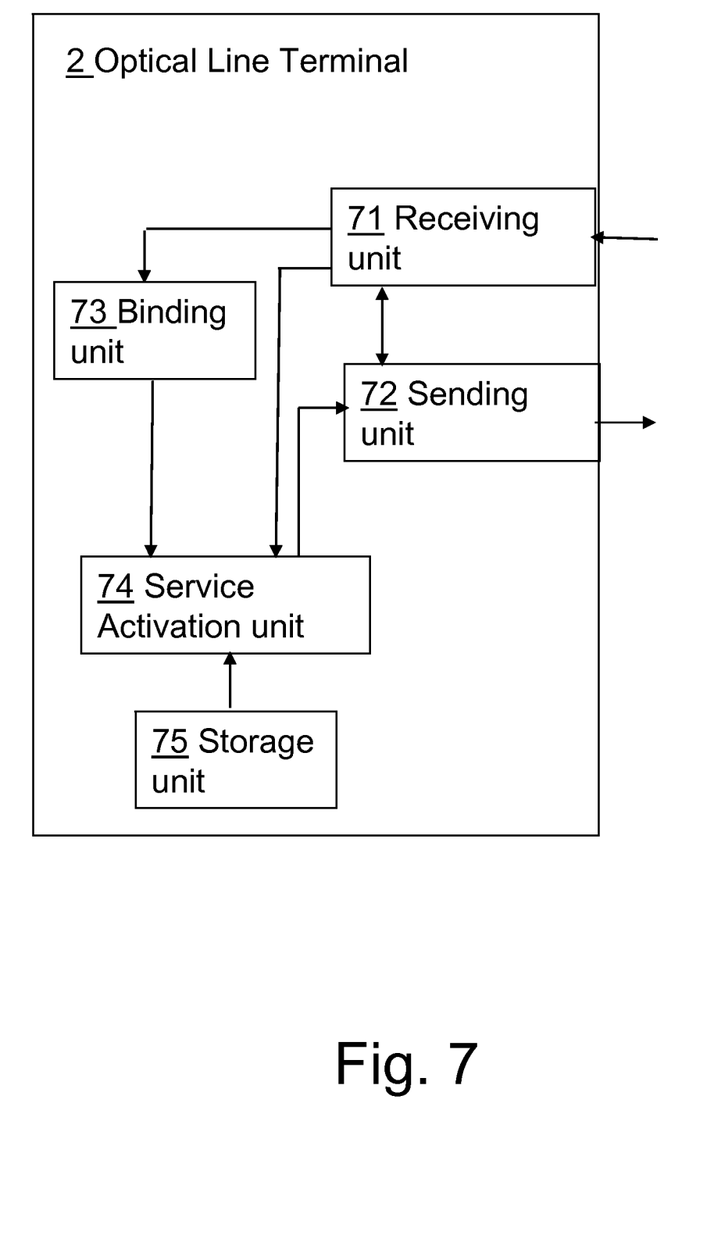
FIGS. 7 and 8 schematically illustrates an exemplary OLT.

FIG. 7 schematically illustrates an OLT, according to exemplary embodiments. A typical OLT (Optical Line Terminal) provides an interface between the services from the operator, such as e.g. telephony, data and video, and the PON, and the OLT is located at the service provider. The illustrated OLT comprises a Receiving unit 71 for receiving a hardware identity from a discovered Client Device, as well as information from a SIM-card for identifying and authentication of the end-user. The OLT also comprises a Sending unit 72 for forwarding SIM-information for authenticating the end-user to an Authentication Server, and a Binding unit 73, connected to the Receiving unit 72, for creating a relationship between a received hardware identity of a Client device and an authenticated end-user. Further, the illustrated OLT comprises an Activation unit 74, connected to the Sending unit 72 and the Binding unit 73, for activating a service and providing to the Client Device, based on service subscriptions associated with the authenticated end-user, and on hardware-dependent service definitions associated with the Client Device.

The Receiving unit 71 may also be arranged to receive service subscription associated with an end-user from an Authentication server.

According to an exemplary embodiment, the OLT further comprises a Storage unit 75 for storing service subscription definitions relating to the service subscriptions of end-users, and/or hardware-dependent service definitions, the Storage unit being connected to the Activation unit 74.

Figure 8:
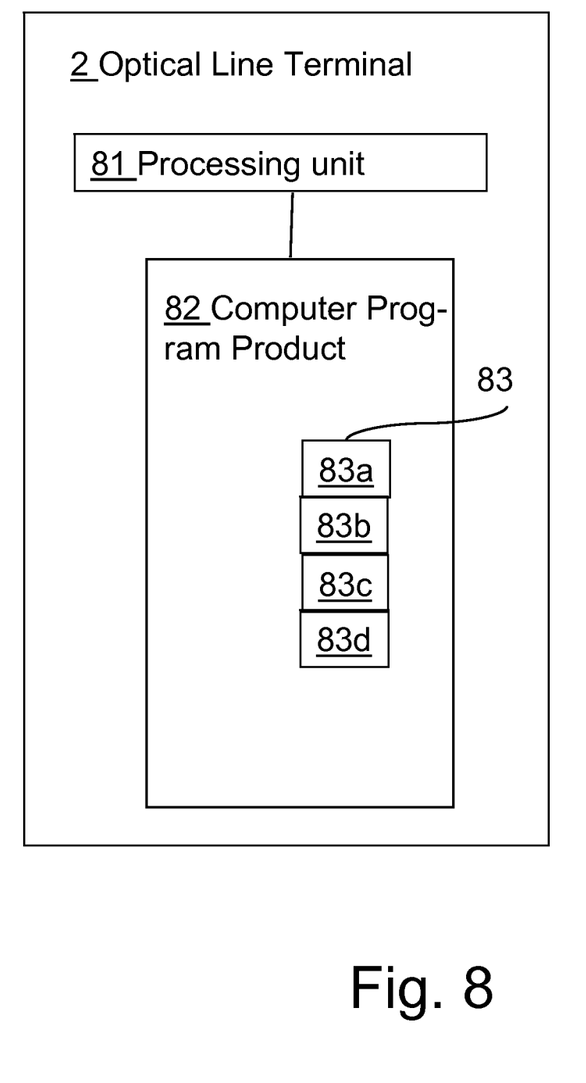

FIG. 8 schematically illustrates an embodiment of the OLT, which is an alternative way of disclosing the embodiment illustrated in FIG. 7. The OLT 2 comprises a processing unit 81 which may be a single unit or a plurality of units. Furthermore, the OLT 2 comprises at least one computer program product 82 in the form of a non-volatile memory, e.g. an EEPROM (Electrically Erasable Programmable Read-Only Memory), a flash memory or a disk drive. The computer program product 82 comprises a computer program 83, which comprises code means which when run on the OLT 2 causes the processing unit 81 in the OLT to perform the steps of the procedures described earlier in conjunction with FIG. 5.

Hence, in the embodiments illustrated in FIG. 7, the code means in the computer program 83 of the OLT 2 comprises a receiving module 83a, a sending module 83b, a binding module 83c, and an activation module 83d. The modules 83a-83d essentially perform the steps of the flow in FIG. 5 to emulate the OLT described in FIG. 7. In other words, when the different modules 83a-83d are run on the processing unit 81, they correspond to the units 71, 72, 73 and 74 of FIG. 7, which are further explained above in connection with the description text associated with FIG. 7.

Although the code means in the embodiment disclosed above in conjunction with FIG. 8 are implemented as computer program modules which when run on the OLT 2 causes the node to perform the steps described above in conjunction with FIG. 5, one or more of the code means may in alternative embodiments be implemented at least partly as hardware circuits.

Figure 9:
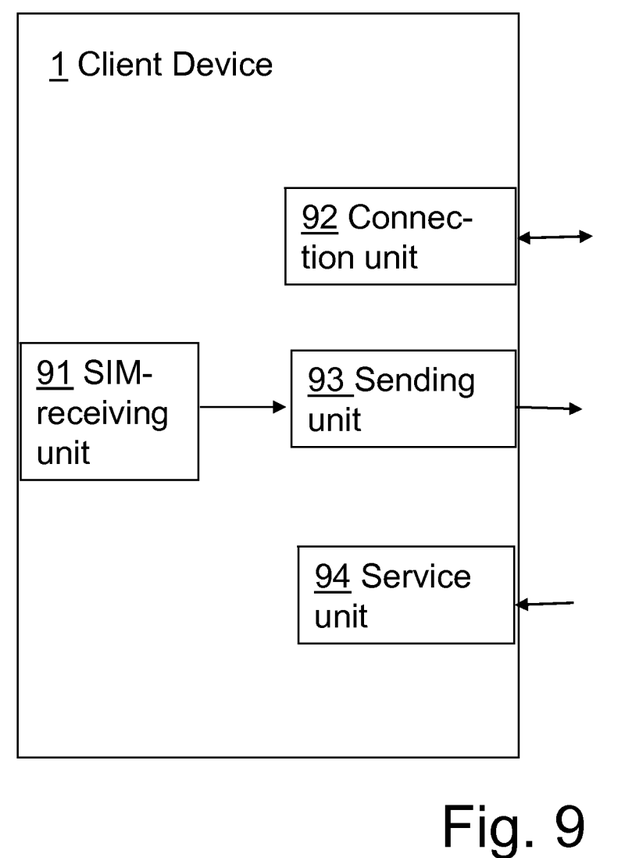
FIGS. 9 and 10 schematically illustrates an exemplary Client device.

FIG. 9 illustrates schematically an exemplary Client Device, according to exemplary embodiments, and the Client Device may be an SFU ONT, or alternatively a CPE connected to an MDU. Conventionally, the ONTs and MDUs are connectable to an OLT over an ODN, and terminate the PON by converting the optical signals into electrical signals for providing services to the end-user. Both an ONT and a CPE are normally adapted to be located at the customer premises, such as e.g. in a home of the end-user. The MDU connected to the CPE is provided with a large number of ports, e.g. 24, in order to provide services to several end-users, and the MDU may be located e.g. in an apartment building.

The illustrated Client device comprises a Connection unit 92 for connecting to the PON, and sending its hardware identity to the OLT. The Client Device also comprises a Sending unit 93 for sending information from a SIM-card to the OLT for authentication of the end-user, and a Service unit 94 for receiving a service activated and provisioned by the OLT.

According to a further embodiment, the Client Device comprises a SIM-receiving unit 91 for receiving a SIM-card inserted by the end-user. According to another embodiment (not illustrated in FIG. 9) the Client Device is adapted to install a Soft-SIM (Software Subscriber Identity Module), instead of receiving a hardware SIM-card.

The Client Device may correspond to a single family unit ONT, or to a CPE connected to a MDU.

Figure 10:
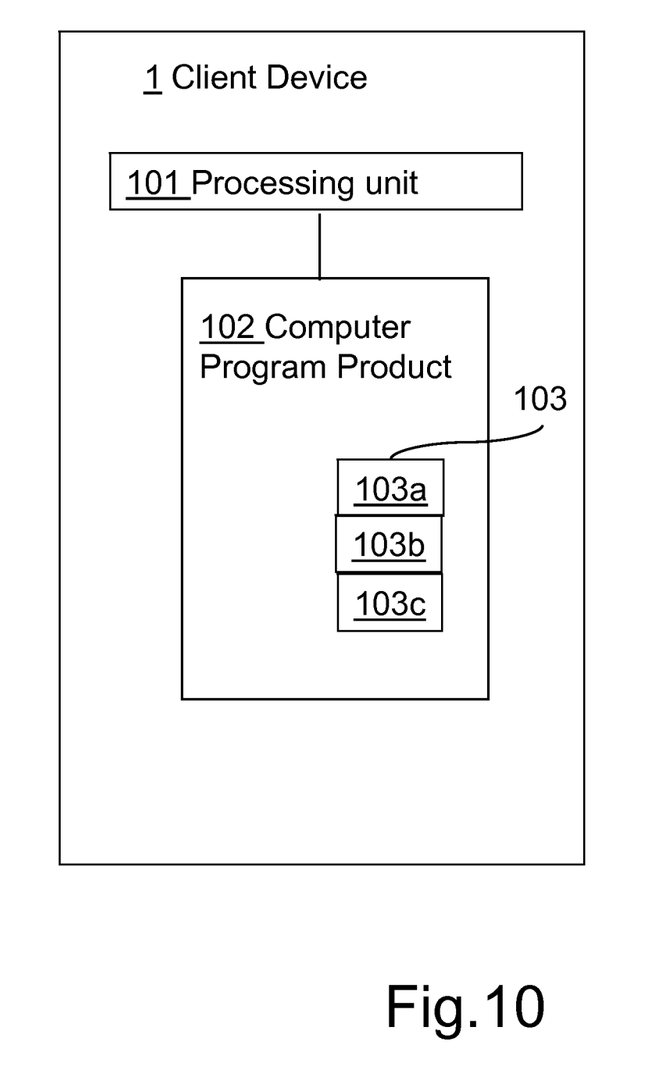

FIG. 10 schematically illustrates an embodiment of the Client Device, which is an alternative way of disclosing the embodiment illustrated in FIG. 9. The Client Device 1 comprises a processing unit 101 which may be a single unit or a plurality of units. Furthermore, the Client Device 1 comprises at least one computer program product 102 in the form of a non-volatile memory, e.g. an EEPROM (Electrically Erasable Programmable Read-Only Memory), a flash memory or a disk drive. The computer program product 102 comprises a computer program 103, which comprises code means which when run on the Client Device 1 causes the processing unit 101 in the Client Device to perform the steps of the procedures described earlier in conjunction with FIG. 6.

Hence, in the embodiments illustrated in FIG. 9, the code means in the computer program 103 of the Client Device 1 comprises a connection module 103a, a sending module 103b, and a service module 103c. The code means may thus be implemented as computer program code structured in computer program modules. The modules 103a-103c essentially perform the steps of the flow in FIG. 6 to emulate the Client Device 1 described in FIG. 9. In other words, when the different modules 103a-103c are run on the processing unit 101, they correspond to the units 92, 93 and 94 of FIG. 9, which are further explained above in connection with the description text associated with FIG. 9.

Although the code means in the embodiment disclosed above in conjunction with FIG. 10 are implemented as computer program modules which when run on the Client Device 1 causes the node to perform the steps described above in conjunction with FIG. 6, one or more of the code means may in alternative embodiments be implemented at least partly as hardware circuits.

Thus, as implied above, it should be noted that the OLT 2, as illustrated in FIGS. 7 and 8, and the Client Device 1, as illustrated in FIGS. 9 and 10, may be implemented by physical or logical entities using software functioning in conjunction with a programmed microprocessor or general purpose computer, and/or using an application specific integrated circuit (ASIC). They may further include suitable internal and external storage devices, as well as appropriate communication interfaces, including hardware and software capable of performing the necessary modulating, coding, filtering and the like, as well as demodulating and decoding to process such signals.

It is an advantage with the embodiments that the hardware equipment is "de-coupled" from the subscriber, enabling the operator to install the hardware equipment in advance, and to activate the service later. Further, the installed hardware equipment may remain in a building when a customer leaves the operator or move to a new location, rather than requiring a re-installation.

When an end-user/customer starts subscribing to a service, he/she will receive a SIM card from an operator, and can activate the service simply by inserting the SIM-card into a previously installed device, or by installing a Soft-SIM. Thus, the service activation and the hardware installation do not have to be performed at the same time.

Further, since the hardware equipment is disconnected from the end-user identity, and the hardware equipment and the end-user are authenticated separately, the network operator does not have to be the same as the service provider.

However, the above mentioned and described embodiments are only given as examples and should not be limiting to the present invention. Other solutions, uses, objectives, and functions within the scope of the invention as claimed in the accompanying patent claims should be apparent for the person skilled in the art.

The invention claimed is:

1. A method for an Optical Line Terminal connected to a Passive Optical Network of providing a service to a Client device, the method comprising:
   discovering a Client device connected to the Passive Optical Network and receiving a hardware identity including a type of hardware equipment for authentication of the Client device;
   authenticating the client device according to the hardware identity;
   receiving SIM-authentication information from a Subscriber Identity Module (SIM) of the Client device, and forwarding the SIM-authentication information to an Authentication Server for authentication of an end-user;
   receiving an end-user authentication indication from the Authentication Server;

creating a relationship between the Client device and the end-user binding the hardware identity of the Client device and the end-user authentication indication; and activating a service for the client device using the relationship to have the service based (A) on service subscriptions associated with the end-user and (B) on hardware-dependent service definitions corresponding to the type of hardware equipment of the Client device.

2. The method according to claim 1, wherein the Client device is provided with a SIM-card, which identifies the end-user.

3. The method according to claim 1, further comprising a provisioning of the service, the provisioning comprising configuring the service depending on hardware of the Client device, the configuring being based on the hardware-dependent service definitions.

4. The method according to claim 1, wherein the hardware-dependent service definitions are stored in the Optical Line Terminal.

5. The method according to claim 1, further comprising establishing a communication channel to the Client device over an Optical Distribution Network.

6. The method according to claim 1, further comprising receiving service subscriptions associated with the end-user from the Authentication Server.

7. The method according to claim 1, wherein service subscriptions associated with the end-user are stored in the Optical Line Terminal.

8. A method for a Client device of receiving a service provided by an Optical Line Terminal connected to a Passive Optical Network, the method comprising:

connecting to the Passive Optical Network, and sending a hardware identity of the Client device including a type of hardware equipment to the Optical Line Terminal for authentication of the Client device and configuring the service according to hardware-dependent service definitions corresponding to the type of hardware equipment;

sending SIM-authentication information from a Subscriber Identity Module (SIM) of the Client device to the Optical Line Terminal, to be forwarded to an Authentication Server for authentication of an end-user; and receiving a service activated by the Optical Line Terminal, based (A) on a service subscription associated with the end-user, (B) on the hardware-dependent service definitions associated with the Client device, and (C) on a relationship between the Client device and the end-user.

9. The method according to claim 8, further comprising the Client device receiving a SIM-card, which identifies the end-user.

10. The method according to claim 8, wherein a communication channel is established to the Optical Line Terminal over an Optical Distribution Network.

11. The method according to claim 8, wherein the Client device is a Single Family Unit Optical Network Termination.

12. The method according to claim 8, wherein the Client device is a Customer Premises Equipment connected to a Multi-Dwelling Unit, the Customer Premises Equipment communicating with the Optical Line Terminal over the Multi-Dwelling Unit.

13. An Optical Line Terminal connectable to a Passive Optical Network, the Optical Line Terminal being arranged to provide a service to a Client device of the Passive Optical Network, the Optical Line Terminal comprising:

a receiving circuit for receiving, from a client device, a hardware identity including a type of hardware equipment, for authenticating the Client device based on the hardware identity, and for receiving SIM-authentication information from a Subscriber Identity Module (SIM) of the Client device, for authenticating an end-user;

a sending circuit for forwarding the SIM-authentication information to an Authentication Server;

a binding circuit for creating a relationship between the client device and the end-user in view of the hardware identity of the Client device and an authentication indication received from the Authentication Server in response to the sending circuit forwarding the SIM-authentication information; and a service activating circuit for activating a service to the Client device using the relationship to have the service based on a service subscription associated with the end-user, and on hardware-dependent service definitions corresponding to the type of hardware equipment of the Client device.

14. The Optical Line Terminal according to claim 13, wherein the service activating unit is further arranged to provision a service by configuring a service depending on hardware of the Client device, the configuring being based on said hardware-dependent service definitions.

15. The Optical Line Terminal according to claim 13, further arranged to establish a communication channel to the Client device over an Optical Distribution Network.

16. The Optical Line Terminal according to claim 13, wherein the receiving unit is further arranged to receive service subscriptions associated with an end-user from the Authentication server.

17. The Optical Line Terminal according to claim 13, further comprising a storage unit for storing service subscriptions associated with an end-user.

18. The Optical Line Terminal according to claim 17, wherein the storage unit is further arranged to store the hardware-dependent service definitions.

19. A Client Device connectable to a Passive Optical Network and arranged to receive a service provided by an Optical Line Terminal, the Client device comprising:

a connection circuit for connecting to the Passive Optical Network, and sending a hardware identity including a type of hardware equipment to the Optical Line Terminal for authenticating the Client device;

a sending circuit for sending SIM-authentication information received from a Subscriber Identity Module of the Client device to the Optical Line Terminal for authenticating an end-user;

a service circuit for receiving a service activated by the Optical Line Terminal, the activation being based (A) on a service subscription associated with an end-user, (B) on the hardware-dependent service definitions corresponding to the type of hardware equipment of the Client device, and (C) on a relationship created between the end-user and the Client device.

20. The Client Device according to claim 19, further comprising a SIM-card-receiving unit.

21. The Client Device according to claim 19, wherein the Client device corresponds to a Single Family Unit Optical Network Termination.

22. The Client Device according to claim 19, wherein the Client device corresponds to a Customer Premises Equipment connected to a Multi-Dwelling Unit, the Customer Premises Equipment being configured to communicate with the Optical Line Terminal over the Multi-Dwelling Unit.

* * * * *

UNITED STATES PATENT AND TRADEMARK OFFICE
CERTIFICATE OF CORRECTION

| | | |
|---|---|---|
| PATENT NO. | : 8,677,468 B2 | Page 1 of 1 |
| APPLICATION NO. | : 13/008985 | |
| DATED | : March 18, 2014 | |
| INVENTOR(S) | : Nors | |

It is certified that error appears in the above-identified patent and that said Letters Patent is hereby corrected as shown below:

In the Specification

Column 1, Line 18, delete "Network or" and insert -- Network) or --, therefor.

Column 7, Lines 12-13, delete "Authentication Server 5," and
insert -- Authentication Server 3, --, therefor.

Column 8, Line 45, delete "Receiving unit 72," and insert -- Receiving unit 71, --, therefor.

Signed and Sealed this
Ninth Day of September, 2014

Michelle K. Lee
*Deputy Director of the United States Patent and Trademark Office*